(12) United States Patent
Peinado Gutierrez et al.

(10) Patent No.: US 11,820,160 B2
(45) Date of Patent: Nov. 21, 2023

(54) CALIBRATION OF PRINTING DEVICES

(71) Applicant: HEWLETT-PACKARD DEVELOPMENT COMPANY, L.P., Spring, TX (US)

(72) Inventors: David Peinado Gutierrez, Sant Cugat del Valles (ES); Eduardo Martin Orue, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/639,691

(22) PCT Filed: Oct. 3, 2019

(86) PCT No.: PCT/US2019/054428
§ 371 (c)(1),
(2) Date: Mar. 2, 2022

(87) PCT Pub. No.: WO2021/066830
PCT Pub. Date: Apr. 8, 2021

(65) Prior Publication Data
US 2022/0288960 A1    Sep. 15, 2022

(51) Int. Cl.
*G06F 3/12* (2006.01)
*B41J 29/393* (2006.01)
*H04N 1/60* (2006.01)

(52) U.S. Cl.
CPC .......... *B41J 29/393* (2013.01); *H04N 1/6033* (2013.01); *G06F 3/1205* (2013.01)

(58) Field of Classification Search
None
See application file for complete search history.

(56) References Cited

U.S. PATENT DOCUMENTS

| | | | |
|---|---|---|---|
| 8,672,436 B2 | 3/2014 | Powers | |
| 8,727,476 B2 | 5/2014 | Pous | |
| 9,296,238 B2 | 3/2016 | Sender Beleta | |
| 9,688,066 B2 | 6/2017 | Yamanobe | |
| 10,282,645 B2 | 5/2019 | Yamamoto | |
| 2005/0212896 A1 | 9/2005 | Nishitani et al. | |
| 2012/0044540 A1 | 2/2012 | Dalal et al. | |
| 2012/0105529 A1 | 5/2012 | Powers et al. | |
| 2012/0229620 A1* | 9/2012 | Ikeda | B25J 9/1697 348/94 |
| 2013/0321514 A1 | 12/2013 | Pous et al. | |
| 2014/0240389 A1 | 8/2014 | Wu et al. | |
| 2017/0313537 A1 | 11/2017 | Herrmann | |
| 2018/0220013 A1 | 8/2018 | Borrego Lebrato | |
| 2018/0244090 A1 | 8/2018 | Liu et al. | |

(Continued)

FOREIGN PATENT DOCUMENTS

| | | |
|---|---|---|
| DE | 102017206534 | 11/2017 |
| JP | 2005-306605 A | 11/2005 |
| JP | 2008-080579 A | 4/2008 |

(Continued)

*Primary Examiner* — Lennin R Rodriguezgonzalez

(57) ABSTRACT

Examples relate to methods of calibrating a printing device. A method comprises generating a calibration sheet of a calibrating medium having a length at least equal to the maximum printing width of a printbar of the printing device and printing a plurality of calibration patterns on the calibration sheet with the printing device to be calibrated.

14 Claims, 5 Drawing Sheets

(56) References Cited

U.S. PATENT DOCUMENTS

2019/0193441 A1   6/2019  Morovic et al.

FOREIGN PATENT DOCUMENTS

| JP | 2010-284909 A | 12/2010 |
| JP | 2012-096539 A | 5/2012 |
| JP | 2014-100854 A | 6/2014 |
| JP | 2015-013452 A | 1/2015 |
| JP | 2017-197384 A | 11/2017 |
| JP | 2018-532623 A | 11/2018 |
| WO | 2017/001001 A1 | 1/2017 |
| WO | WO-2017086978 | 5/2017 |

* cited by examiner

CALIBRATION OF PRINTING DEVICES

BACKGROUND

A printing device may include a printbar with a plurality of submodules that deliver print agent onto a printable medium so as to print an image of a print job. In order to optimize color reproduction by a printing device on a print media, a calibration process is performed on the printing device.

BRIEF DESCRIPTION OF THE DRAWINGS

Various example features will be apparent from the detailed description which follows, taken in conjunction with the accompanying drawings, wherein.

DETAILED DESCRIPTION

Figure 1:
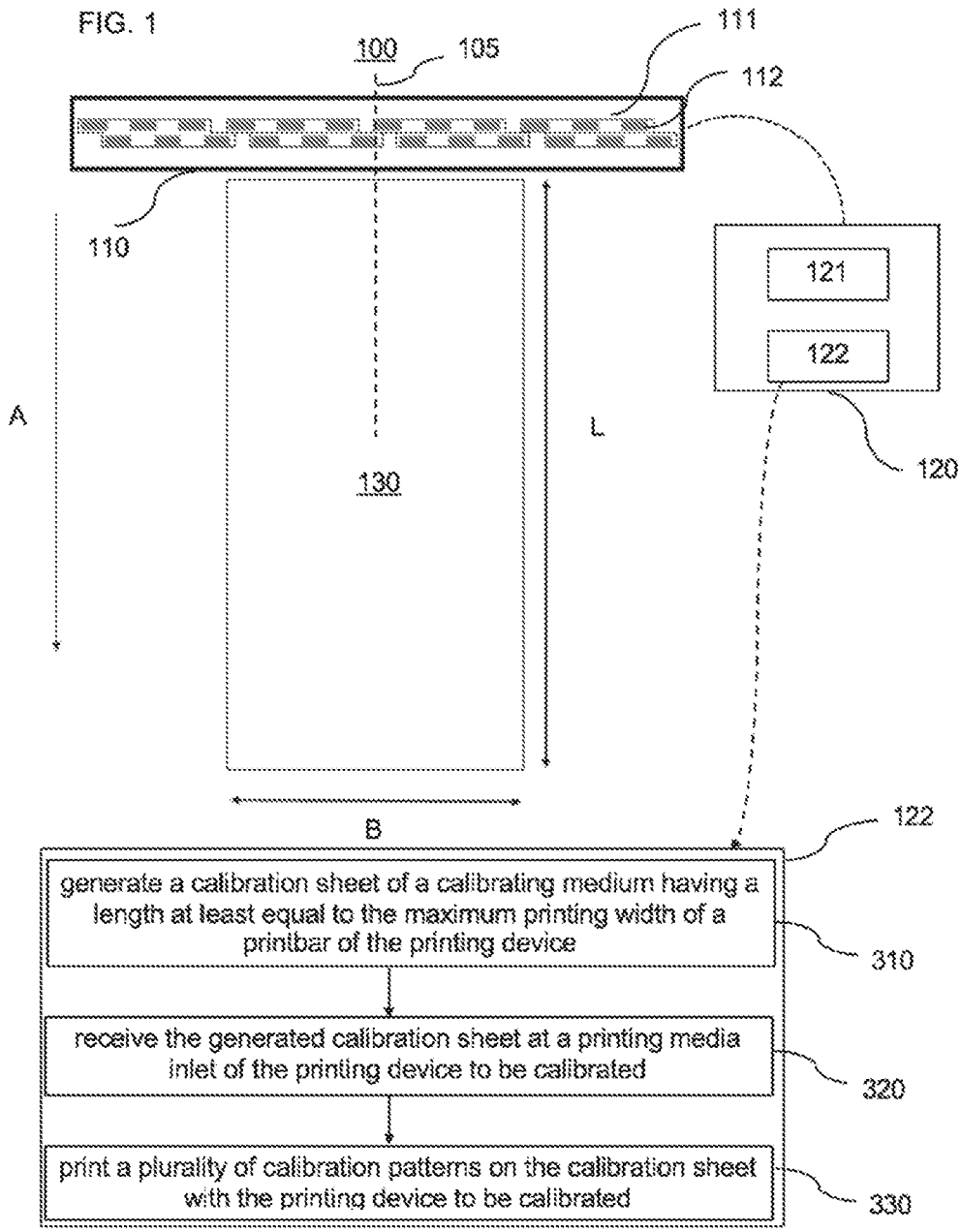
FIG. 1 illustrates an example of a printing system according to the present disclosure and a zoom-in view schematically representing an example of a non-transitory machine-readable storage medium according to the present disclosure.

A printing system comprises a printhead which may deliver print agent onto a printable medium, e.g. paper sheet. The printhead may be provided with a plurality of nozzles to deliver print agent, e.g. ink or other printing fluids, onto the printable medium so as to print an image of a print job.

In some examples, the printhead may be static. The printhead may extend along a width of a printable medium. The plurality of nozzles may be distributed within the printhead along the width of the printable medium. The width of the printable may be substantially perpendicular to an advancing axis of the printable medium. The advancing axis may also be referred to as the media axis. Such an arrangement may allow most of the width of the printable medium to be printed simultaneously. These printer systems may be referred to as page-wide array (PWA) printer systems. A printing device, such as an inkjet printing device, includes a printbar assembly that has print modules with one or more printheads to deposit a printing agent, such as ink, onto a print media. The one or more printheads of the print modules collectively span a width of a print region, when the printbar assembly is in a print position.

A controller may control print agent delivered by the plurality of nozzles onto the printable medium to follow an image pattern of the print job. The image pattern may be analyzed by, for example, a processor before delivering print agent onto the printable medium. In some examples, the image pattern to be printed may be analyzed before starting the print job.

In this disclosure, a print job refers to a unit of work to be run on a printing system for printing a text and/or an image. It applies to any text or images which can be printed in any size and may be used in for example in textiles applications, such as sportswear, multiple-page brochures and posters. A print job may comprise a single image or a plurality of images. A print job may be assigned with a unique job number and can comprise one or more files.

In order to optimize printing quality, printing devices may be calibrated prior to a first use and subsequently at regular and/or periodic intervals. This allows the output of the printer to be compared against a pre-defined reference and adjustments made to correct any discrepancies.

For example, inkjet printers print dots on a print medium by ejecting small drops of a print agent (e.g., ink or other printing fluids) from one or more nozzles. In order to optimize color reproduction in an image built up on the print medium from a large number of drops of printing agent, it is beneficial that portions of the image printed by different nozzles have equivalent colorimetry. This can be achieved by ensuring that the amount of print agent present in each drop is the same for each drop ejected from all of the nozzles. Alternatively, for print elements that are found to eject smaller drops, the average number of drops ejected by that print element may be increased.

However, the amount of print agent present in each ejected drop may vary due to slight differences between nozzles, due to changes in the print agent being used, or for other reasons. A calibration process may be performed at regular intervals in order to determine colorimetry of the printer output as compared to a desired reference. The calibration process allows the control signals provided to each nozzle, or portion of a printhead to be adjusted such that the output is corrected for any variation that has occurred. This may be achieved by modifying the control signals directly based on calibration parameters, or by altering the image data to be printed to take account of variations in the response of the nozzles being used to print the image.

Color calibration may be performed by printing and measuring a set of patches (e.g., patterns) in order to determine the state of a given printer with respect to a pre-defined reference, subsequently compensating for any changes due to, for example, time, usage, or environmental conditions. A test patch may comprise a number of shades of each primary color.

Page-wide array systems (PWA) comprise a printbar with a plurality of modules, each module having a plurality of submodules (printheads). Color uniformity along the printbar is a factor to optimize printing quality. Color differences along the printbar, a defect known as banding or non-color uniformity, may be caused by different factors, such as, thermal variances or aerodynamics phenomena. In order to optimize color uniformity, the printbar submodules are calibrated by printing calibration patterns on a printable medium, acquiring information therefrom, and processing the acquired information.

However, in some systems, for example, in PWA systems, the submodules that do not fit into the printable medium might not be calibrated during a calibration procedure.

For example, a PWA printing device may be used with rolls of printable media of different widths. The width of the printable media may span the entire printing width of the printbar, or in some cases may be smaller than the entire printing width of the printbar. Therefore, a calibration may be performed with a printable medium whose width does not span the maximum longitudinal printing extent of the printbar. In such cases, those submodules of the printbar which participate in printing during a calibration procedure will be calibrated, while the submodules that do not fit in the printable medium width may not be optimally calibrated.

Suboptimal calibration of a submodule may also potentially occur when the submodule has been subject to displacement along the printbar axis 115. This is referred to as the roll indexing effect and may result in suboptimal calibration.

The suboptimal calibration of the printbar submodules may impact the quality of the print jobs.

Examples of the methods and systems disclosed herein may be used to perform a calibration procedure such that every submodule of the printbar is calibrated, FIG. 1 schematically illustrates an example of a printing device 100 according to the present disclosure. The printing device 100 comprises a print bar 110 comprising a plurality of modules 111. Each module 111 comprises a plurality of submodules or printheads 112. The submodules 112 comprise a plurality of nozzles (not shown in FIG. 1) to deliver print agent. Print agent may be delivered onto a printable medium. In this disclosure, delivering includes firing, ejecting, spitting or otherwise depositing print agent or ink. The printing system 100 further comprises a calibration sensor (not shown).

In some examples, a heating element may cause a rapid vaporization of print agent in a print agent chamber, increasing an internal pressure inside this print agent chamber. This increase in pressure makes a drop of print agent exit from the print agent chamber to the printable medium through a nozzle. These printing systems may be called as thermal inkjet printing systems.

In some examples, a piezo electric may be used to force a drop of print agent to be delivered from a print agent chamber onto the printable medium through a nozzle. A voltage may be applied to the piezo electric, which may change its shape. This change of shape may force a drop of print agent to exit through the nozzle. These printing devices may also be referred to as piezo electric printing devices.

The printable medium may advance or move along the advancing axis 105 following the direction represented by arrow A. The printable medium may be moved by an advancer (not shown in FIG. 1). An advancer may include a roller and/or a wheel. The printable medium may be of any shape or size to be used in the printing system.

The printable medium is a material capable of receiving a print agent, e.g. ink. In some examples, the printable medium may be a sheet of paper. This sheet of paper may be used in a subsequent dye sublimation process. In some examples, the printable medium may a sheet of cardboard, textile material or plastic material.

In some examples, the printhead may statically span substantially the whole width of the printable medium. The printhead may be used in a page-wide array (PWA) printing system.

The printbar 110 of FIG. 1 comprises a plurality of modules 111, each comprising a plurality of submodules 112. Each submodule or printhead comprises a plurality of nozzles. Nozzles of the plurality of nozzles may be placed in subgroups. The subgroups may comprise nozzles grouped in rows, i.e. parallel to the printbar longitudinal axis 115, and in columns, i.e. parallel to advancing axis 105. Longer rows may lead to swaths having a greater height (in the advancing axis 105) if all nozzles were to deliver print agent. In this disclosure, a swath refers to an area of a printable medium that can be printed by the printing modules in a single pass, i.e. from one lateral side of the printable medium to the opposite side along the printbar longitudinal axis 115.

Examples herein provide printing devices and methods of calibrating a printing device having multiple print modules while reducing the time and length of print media used to perform the calibration.

In some examples, a printing device comprises a printbar comprising a plurality of modules, and a controller to instruct the printing device to generate a sheet of calibration medium of a length at least equal to a maximum printing width of the printbar instruct the printing device to execute a calibration procedure. The controller generates a prompt to request that the sheet of calibration medium be provided to a printing media inlet of the printing device such that a side of the sheet of calibration medium having a length at least equal to a maximum printing width of the printbar is parallel to the print bar.

As shown in the example of FIG. 1, the printable media present in the printing device 100 has a width B which is smaller than the width (W) of the printbar. Thus, if a calibration is performed not all submodules will fit in the printing width B and thus not all submodules will be calibrated.

The calibration sheet may be generated from a roll of printable medium present in the printing device.

In some examples, the printing device 100 is a Page-Wide array (PWA) printing device.

In some examples, each of the plurality of modules comprise a plurality of submodules, and each one of the plurality of submodules prints a calibration pattern of the plurality of calibration patterns on the generated calibration sheet as part of the calibration procedure. In this manner, calibration information may be generated and acquired for each of the submodules.

In some examples, the controller receives a sensed calibration datum related to each one of a plurality of submodules of a printbar of the printing device based at least in part on a calibration pattern printed by the submodule, Thus, all submodules may be calibrated.

In some examples, the controller generates calibration parameters based at least in part on the measured or acquired calibration data.

In some examples, a method for calibrating a printing device comprises generating a calibration sheet of a calibrating medium having a length at least equal to the maximum printing width of a printbar of the printing device, receiving the generated calibration sheet at a printing media inlet of the printing device to be calibrated such that a side of the generated calibration sheet having a length at least equal to a maximum printing width of the print bar is perpendicular to a media axis of the printing device; and printing a plurality of calibration patterns on the calibration sheet with the printing device to be calibrated.

A maximum printing width (W) is a width spanning the entire printing extension of the submodules or printheads along a longitudinal axis of the printbar. Thus, all nozzles may be involved in the printing when a sheet of printable medium is at least as wide as the maximum printing width.

Figure 2:
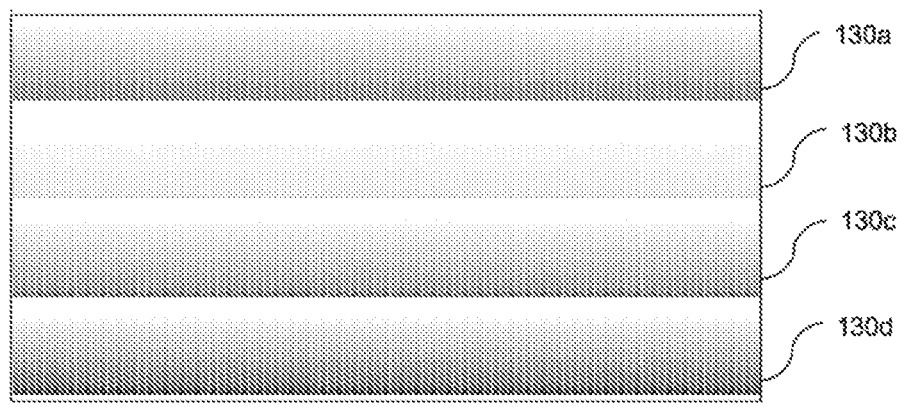
FIG. 2 illustrates an example of a plurality of calibration patterns printed on a sheet of printable medium.

The printing device 100 of FIG. 1 comprises a controller 120 to instruct the printing device 100 to generate a calibration sheet 130 of a calibrating medium having a length at least equal to the maximum printing width of a printbar of the printing device, receive the generated calibration sheet at a printing media inlet (not shown) of the printing device to be calibrated such that a side of the generated calibration sheet having a length at least equal to a maximum printing width of the print bar is perpendicular to a media axis of the printing device 100, and print a plurality of calibration patterns (for example, calibration patterns as shown in FIG. 2) on the calibration sheet with the printing device 100 for carrying out a calibration procedure. The calibration medium may comprise any printable medium suitable for use with the printing device to be calibrated.

For example; the controller 120 may receive an instruction, or generate an instruction based on a periodic interval rule or based on a printer initiation routine to carry out a calibration procedure.

A complete calibration of the printbar printheads may thus be performed. This calibration may thus, for example, improve color uniformity and optimize printing quality.

In some examples, the controller 120 may control the print agent, e.g. ink, ejected by the plurality of nozzles. In some examples, a specific print agent controller may be used to control the print agent delivered by the plurality of nozzles. In some examples, each of the nozzles of the plurality of nozzles may be controlled independently to deliver print agent. In some examples, a group of nozzles of the plurality of nozzles may be independently controlled. In some examples, the printhead may comprise resistances associated with the plurality of nozzles. For example, a resistance associated with a nozzle may cause this nozzle to fire and print agent may thus be delivered. An extensive use of some nozzles may thus produce an increase in a temperature of these nozzles and of print agent delivered by them. In some examples, the printhead may comprise a temperature sensor to measure a temperature of the plurality of nozzles or of a group of nozzles of the plurality of nozzles.

The controller 120 may further control the printing device to perform calibration tasks.

In FIG. 1, the controller 120 includes a processor 121 and a non-transitory machine-readable storage medium 122. The non-transitory machine-readable storage medium 122 is coupled to the processor 131.

The processor 111 performs operations on data. In an example, the processor is an application specific processor, for example a processor dedicated to control executing a calibration procedure. The processor 121 may also be a central processing unit for controlling the operation of the printing system.

The non-transitory machine-readable storage medium 122 may include any electronic, magnetic, optical, or other physical storage device that stores executable instructions. The non-transitory machine-readable storage medium 122 may be, for example, Random Access Memory (RAM), an Electrically-Erasable Programmable Read-Only Memory (EEPROM), a storage drive, an optical disk, and the like.

FIG. 1 additionally comprises a zoom-in view schematically representing an example of a non-transitory machine-readable storage medium 122 according to the present disclosure. The non-transitory machine-readable storage medium 122 is encoded with instructions which, when executed by the processor 121, cause the processor 121 to instruct the printing device to generate a calibration sheet of a calibrating medium having a length at least equal to the maximum printing width of a printbar of the printing device as represented at block 310, receive the generated calibration sheet at a printing media inlet of the printing device to be calibrated such that a side of the generated calibration sheet having a length at least equal to a maximum printing width of the print bar is perpendicular to a media axis of the printing device as represented at block 320, and print a plurality of calibration patterns on the calibration sheet with the printing device to be calibrated as represented at block 330.

In some examples, a non-transitory machine-readable storage medium 122 according to the present disclosure is encoded with instructions which, when executed by the processor 121, cause the processor 121 to instruct the printing device to generate a calibration sheet of a calibrating medium having a length at least equal to the maximum printing width of a printbar of the printing device as represented at block 310 and print a plurality of calibration patterns on the calibration sheet with the printing device to be calibrated as represented at block 330.

The instructions encoded in the non-transitory machine-readable storage medium for the processor represented at blocks 310, 320 and 330 may participate in executing a calibration procedure.

FIG. 2 is a schematic illustration of a plurality of calibration patterns 130$a$, $b$, $c$, $d$ printed on the generated calibration sheet 130, wherein each of the calibration patters 130$a$, $b$, $c$, $d$ is printed by a different submodule. The calibration sheet 130 is generated from a printable medium. According to the present disclosure, each of the submodules or printheads prints a calibration pattern as part of the calibration procedure.

Figure 3:
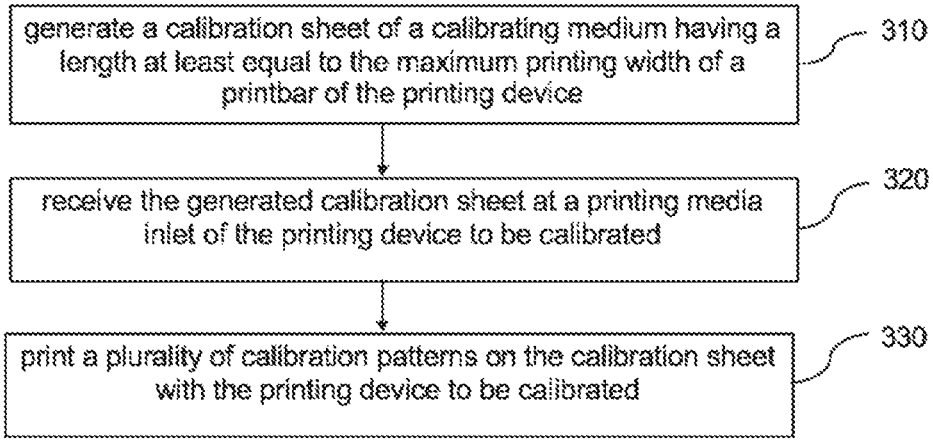
FIG. 3 is a block diagram of an example of a method of calibrating a printing device according to the present disclosure.

FIG. 3 is a block diagram of an example of a method 300 to execute a calibration procedure according to the present disclosure.

In some examples, the method 300 may be applied to any of the examples of printing systems herein described.

In some examples, the printing systems and the non-transitory machine-readable storage medium may be used for performing the method 300 to calibrate a printing device.

In some examples, a method comprises generating a calibration sheet of a calibrating medium having a length at least equal to the maximum printing width of a printbar of the printing device, receiving the generated calibration sheet at a printing media inlet of the printing device to be calibrated such that a side of the generated calibration sheet having a length at least equal to a maximum printing width of the print bar is perpendicular to a media axis of the printing device, and printing a plurality of calibration patterns on the calibration sheet with the printing device to be calibrated.

Block 310 represents generating a calibration sheet of a calibrating medium having a length at least equal to the maximum printing width of a printbar of the printing device. The calibration medium may comprise any printable medium suitable for use with the printing device to be calibrated.

A maximum printing width (W) is a width spanning the entire printing extension of the submodules or printheads along a longitudinal axis of the printbar. Thus, all nozzles may be involved in the printing when a sheet of printable medium is at least as wide as the maximum printing width.

Block 320 represents receiving the generated calibration sheet at a printing media inlet of the printing device to be calibrated such that a side of the generated calibration sheet having a length at least equal to a maximum printing width of the print bar is perpendicular to a media axis of the printing device. The calibration sheet may be provided automatically by the printing device from a printing outlet to the printing media inlet, or it may be provided manually by a user. The printing device may automatically detect presence of the calibration sheet at the printing media inlet prior to starting the calibration procedure or may prompt a user to indicate that the calibration sheet has been provided.

At block 330 a plurality of calibration patterns is printed on the calibration sheet with the printing device to be calibrated.

In some examples, a method comprises generating a calibration sheet of a calibrating medium having a length at least equal to the maximum printing width of a printbar of the printing device and printing a plurality of calibration patterns on the calibration sheet with the printing device to be calibrated.

In some examples, a prompt may be generated to prompt a user to provide the generated calibration sheet to the printing media inlet.

In some examples, the printing device may prompt a user to provide the generated calibration sheet to the printing media inlet such that a side of the calibration sheet with a length at least equal to the maximum printing width is parallel to the printbar. For example, a controller may comprise instructions that may cause the printing device to issue a prompt, for example, via a user interface comprising a display. The prompt may include specific instructions as to how to provide the calibration sheet to the media inlet. For example, the prompt may indicate that the calibration sheet should be provided such that a side having a width at least equal to the printbar or to a maximum printing width of the printbar is parallel to the longitudinal axis (115) of the printbar.

In some examples, the printing device automatically rotates the sheet 90 degrees with respect to the media axis and automatically provides it to the printing media inlet.

In some examples, the printing device receives at the printing media inlet the sheet with a 90 degrees rotation with respect to the media axis.

In some examples, the printing device identifies that the calibration sheet is rotated 90 degrees with respect to the media axis.

In some examples, the printbar comprises a plurality of modules, each module comprising a plurality of submodules, and wherein each one of the plurality of submodules prints a calibration pattern of the plurality of calibration patterns on the generated calibration sheet.

In some examples, the calibration method is performed on a Page-Wide array printing device, wherein a printbar comprises a plurality of modules, each module comprising a plurality of submodules, and wherein each one of the plurality of submodules prints a calibration pattern of the plurality of calibration patterns on the generated calibration sheet.

In some examples, a calibration value for each one of the submodules of the printbar is acquired or measured based at least in part on a calibration pattern printed by the submodule.

In some examples, a calibration parameter is generated for each one of the submodules of the printbar based at least in part on a calibration value.

Figure 4:
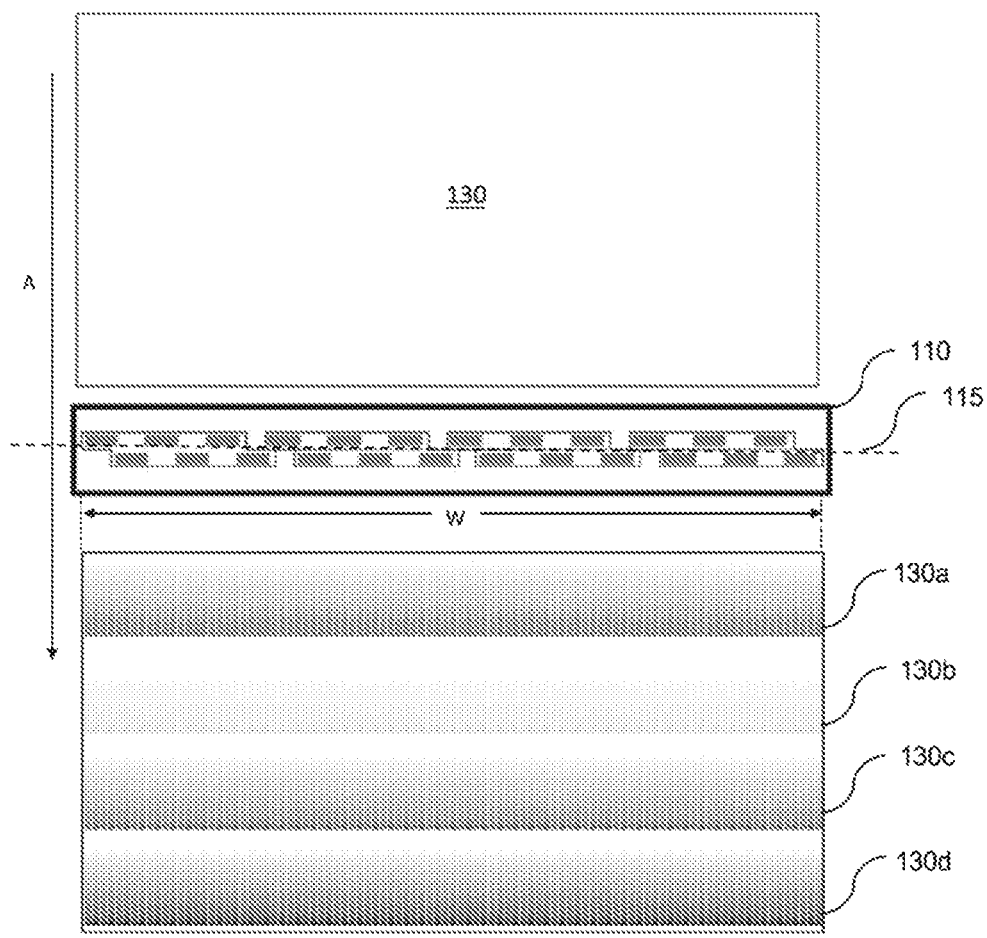
FIG. 4 schematically illustrates an example of a printing system performing a method to calibrate a printing device according to one example of the present disclosure.

FIG. 4 schematically illustrates an example of a printing system performing a method to calibrate a printing device according to one example of the present disclosure. The calibration patterns 130*a, b, c, d* are printed on the calibration sheet 130. The calibration patterns are such that they span the entire maximum printing width (W) of the printbar printheads. Each of the calibration patterns 130*a, b, c, d* may correspond to a different primary color.

Figure 5:
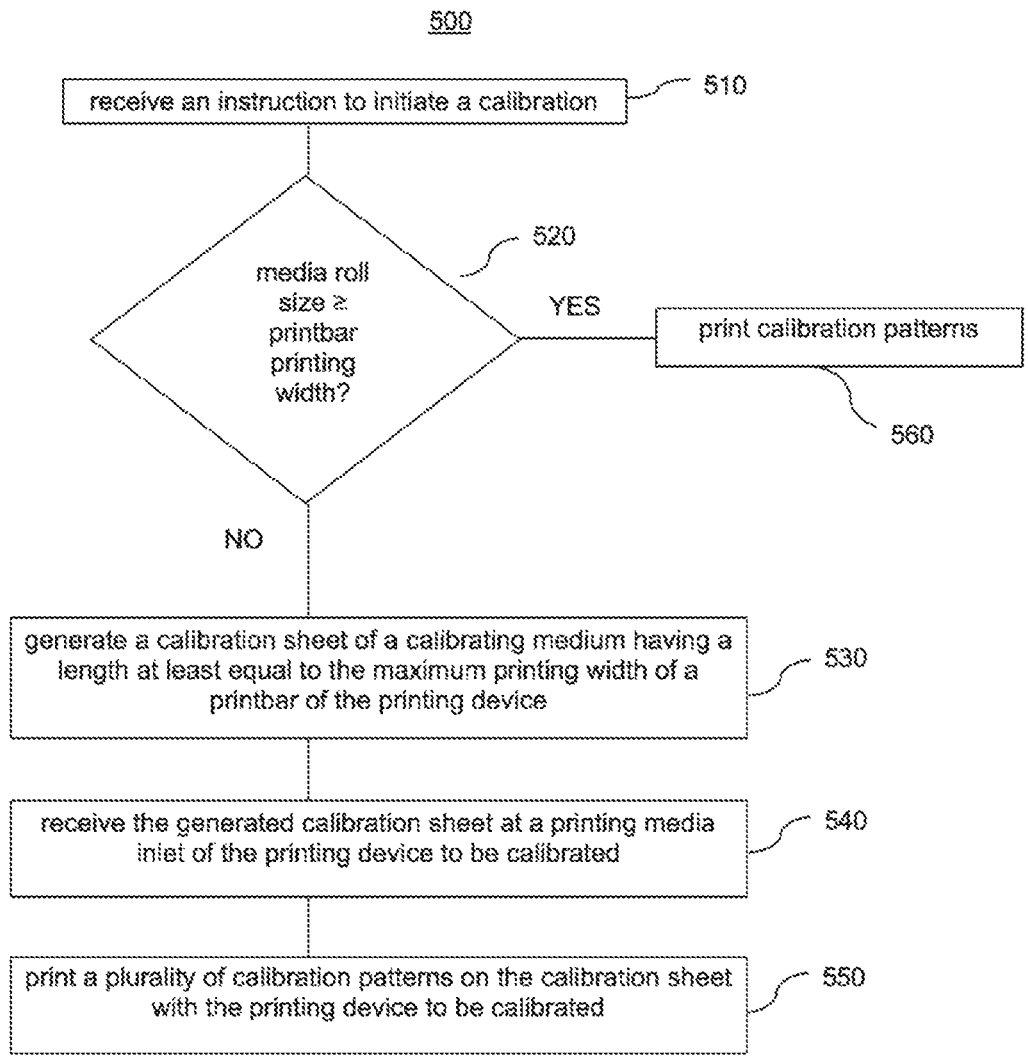
FIG. 5 illustrates an example of a printing system according to the present disclosure and a zoom-in view schematically representing an example of a non-transitory machine-readable storage medium according to the present disclosure.

FIG. 5 schematically illustrates an example of a printing system performing a method of calibrating a printing device according to some examples of the present disclosure.

In some examples; a method for calibrating a printing device comprises receiving an instruction to perform a calibration procedure; detecting if a printable media roll present in the printing device to be calibrated has a width at least equal to the maximum printing width (W) of the printbar, and if the width of the printable media roll is at least equal to the maximum printing width (W) of the printbar proceeding to perform a calibration, and if the width of media roll is not at least equal to the maximum printing width (W) (thus the width of printable media roll is less than the maximum printing width (W) of the printbar) of the printbar; proceeding to generate a calibration sheet of a calibrating medium having a length at least equal to the maximum printing width of a printbar of the printing device, receiving the generated calibration sheet at a printing media inlet of the printing device to be calibrated such that a side of the generated calibration sheet having a length at least equal to a maximum printing width of the print bar is perpendicular to a media axis of the printing device; and printing a plurality of calibration patterns on the calibration sheet with the printing device to be calibrated.

A maximum printing width (W) is a width spanning the entire printing extension of the submodules or printheads along a longitudinal axis of the printbar. Thus, all nozzles may be involved in the printing when a sheet of printable medium is at least as wide as the maximum printing width.

In some examples, a prompt may be generated to prompt a user to provide the generated calibration sheet to the printing media inlet.

In some examples; the printing device may prompt a user to provide the generated calibration sheet to the printing media inlet such that a side of the calibration sheet with a length at least equal to the maximum printing width is parallel to the printbar. For example, a controller may comprise instructions that may cause the printing device to issue a prompt, for example, via a user interface comprising a display. The prompt may include specific instructions as to how to provide the calibration sheet to the media inlet. For example, the prompt may indicate that the calibration sheet should be provided such that a side having a width at least equal to the printbar or to a maximum printing width of the printbar is parallel to the longitudinal axis (115) of the printbar.

In some examples, the printing device automatically rotates the sheet 90 degrees with respect to the media axis and automatically provides it to the printing media inlet.

In some examples, the printbar comprises a plurality of modules, each module comprising a plurality of submodules, and wherein each one of the plurality of submodules prints a calibration pattern of the plurality of calibration patterns on the generated calibration sheet.

In some examples, the calibration method is performed on a Page-Wide array printing device, wherein a printbar comprises a plurality of modules, each module comprising a plurality of submodules, and wherein each one of the plurality of submodules prints a calibration pattern of the plurality of calibration patterns on the generated calibration sheet.

In some examples, a calibration value for each one of the submodules of the printbar is acquired or measured based at least in part on a calibration pattern printed by the submodule.

In some examples, a calibration parameter is generated for each one of the submodules of the printbar based at least in part on a calibration value.

The printing device 100 of FIG. 5 comprises a controller 120 to instruct the printing device 100 to detect if a printable media roll present in the printing device to be calibrated has a width at least equal to the maximum printing width (W) of the printbar, and if the width of the printable media roll is at least equal to the maximum printing width (W) of the printbar proceeding to perform a calibration, and if the width of media roll is not at least equal to the maximum printing width (W) (thus the width of printable media roll is less than the maximum printing width (W) of the printbar) of the printbar, instruct the printing device to generate a calibration sheet 130 of a calibrating medium having a length at least equal to the maximum printing width of a printbar of the printing device, and print a plurality of calibration patterns (for example, calibration patterns as shown in FIG. 2) on the generated calibration sheet with the printing device 100 for carrying out a calibration procedure. The calibration medium may comprise any printable medium suitable for use with the printing device to be calibrated.

For example, the controller 120 may receive an instruction, or generate an instruction based on a periodic interval rule or based on a printer initiation routine to carry out a calibration procedure.

A complete calibration of the printbar printheads may thus be performed. This calibration may thus, for example, improve color uniformity and optimize printing quality.

In some examples, the controller 120 may control the print agent, e.g. ink, ejected by the plurality of nozzles. In some examples, a specific print agent controller may be used to control the print agent delivered by the plurality of nozzles. In some examples, each of the nozzles of the plurality of nozzles may be controlled independently to deliver print agent. In some examples, a group of nozzles of the plurality of nozzles may be independently controlled. In some examples, the printhead may comprise resistances associated with the plurality of nozzles. For example, a resistance associated with a nozzle may cause this nozzle to fire and print agent may thus be delivered. An extensive use of some nozzles may thus produce an increase in a temperature of these nozzles and of print agent delivered by them. In some examples, the printhead may comprise a temperature sensor to measure a temperature of the plurality of nozzles or of a group of nozzles of the plurality of nozzles.

The controller 120 may further control the printing device to perform calibration tasks.

In FIG. 5, the controller 120 includes a processor 121 and a non-transitory machine-readable storage medium 122. The non-transitory machine-readable storage medium 122 is coupled to the processor 131.

The processor 111 performs operations on data. In an example, the processor is an application specific processor, for example a processor dedicated to control executing a calibration procedure. The processor 121 may also be a central processing unit for controlling the operation of the printing system.

The non-transitory machine-readable storage medium 122 may include any electronic, magnetic, optical, or other physical storage device that stores executable instructions. The non-transitory machine-readable storage medium 122 may be, for example, Random Access Memory (RAM), an Electrically-Erasable Programmable Read-Only Memory (EEPROM), a storage drive, an optical disk, and the like.

FIG. 5 additionally comprises a zoom-in view schematically representing an example of a non-transitory machine-readable storage medium 122 according to the present disclosure. The non-transitory machine-readable storage medium 122 is encoded with instructions which, when executed by the processor 121, cause the processor 121 to receive an instruction to perform a calibration procedure as represented at block 510, detect if a printable media roll present in the printing device to be calibrated has a width at least equal to the maximum printing width (W) of the printbar as represented at block 520, and if the width of the printable media roll is at least equal to the maximum printing width (W) of the printbar proceeding to perform a calibration as represented at block 560, and if the width of media roll is not at least equal to the maximum printing width (W) (thus the width of printable media roll is less than the maximum printing width (W) of the printbar) of the printbar, proceeding to generate a calibration sheet of a calibrating medium having a length at least equal to the maximum printing width of a printbar of the printing device as represented at block 530, receiving the generated calibration sheet at a printing media inlet of the printing device to be calibrated such that a side of the generated calibration sheet having a length at least equal to a maximum printing width of the print bar is perpendicular to a media axis of the printing device as represented at block 540; and printing a plurality of calibration patterns on the calibration sheet with the printing device to be calibrated as represented at block 550.

The instructions encoded in the non-transitory machine-readable storage medium for the processor represented at blocks 510, 520, 530, 540, 550, and 560 may participate in executing a calibration procedure.

A plurality of calibration patterns such as shown in FIG. 2 may be printed on the generated calibration sheet 130. The calibration sheet 130 is generated from a printable medium. According to the present disclosure, each of the submodules or printheads prints a calibration pattern as part of the calibration procedure.

Figure 6:
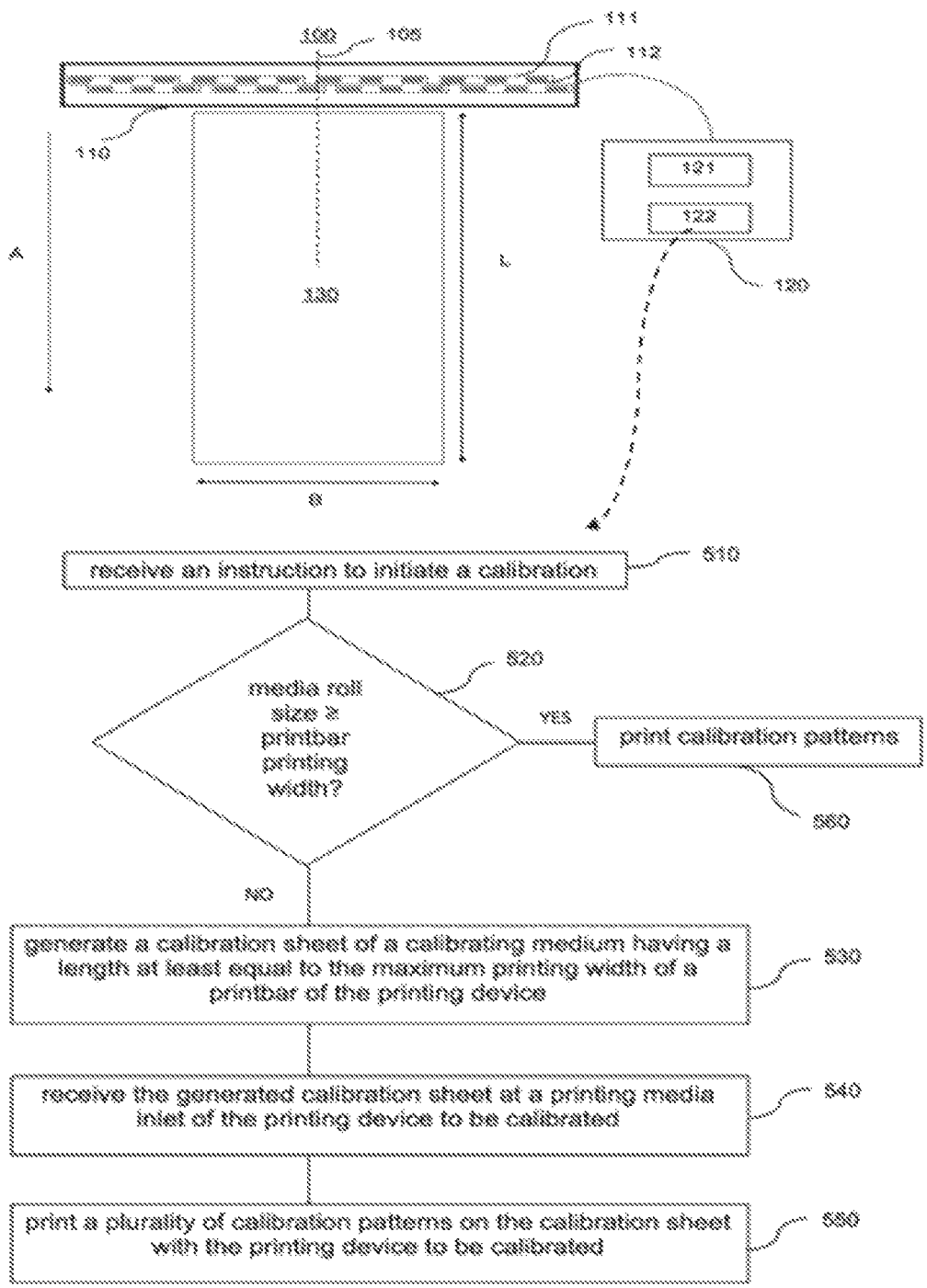
FIG. 6 is a block diagram of an example of a method to calibrate a printing device according to the present disclosure.

FIG. 6 is a block diagram of an example of a method 500 to execute a calibration procedure according to the present disclosure.

In some examples, the method 500 may be applied to any of the examples of printing systems herein described.

In some examples, the printing systems and the non-transitory machine-readable storage medium may be used for performing the method 500 to calibrate a printing device.

In some examples, a method comprises receiving an instruction to perform a calibration procedure, detecting if a printable media roll present in the printing device to be calibrated has a width at least equal to the maximum printing width (W) of the printbar, and if the width of the printable media roll is at least equal to the maximum printing width (W) of the printbar proceeding to perform a calibration, and if the width of media roll is not at least equal to the maximum printing width (W) (thus the width of printable media roll is less than the maximum printing width (W) of the printbar) of the printbar, proceeding to generate a calibration sheet of a calibrating medium having a length at least equal to the maximum printing width of a printbar of the printing device, receiving the generated calibration sheet at a printing media inlet of the printing device to be calibrated such that a side of the generated calibration sheet having a length at least equal to a maximum printing width of the print bar is perpendicular to a media axis of the printing device; and printing a plurality of calibration patterns on the calibration sheet with the printing device to be calibrated.

At Block 510 an instruction is received to perform a calibration procedure.

At Block 520 it is determined if the printable medial roll present in the printing device to be calibrated is at least equal to the maximum printing width (W) of the printbar.

If at Block 520 it is determined that the printable medial roll present in the printing device to be calibrated is not at least equal to the maximum printing width (W) of the printbar, the method proceeds to block 530.

At Block 530 a calibration sheet is generated of a calibrating medium having a length at least equal to the maximum printing width of a printbar of the printing device.

At Block 540 the generated calibration sheet is received at a printing media inlet of the printing device to be calibrated such that a side of the generated calibration sheet having a length at least equal to a maximum printing width of the print bar is perpendicular to a media axis of the printing device.

At Block 550 a plurality of calibration patterns is printed on the calibration sheet with the printing device to be calibrated.

However, if at block 520 it is determined that the printable medial roll present in the printing device to be calibrated is at least equal to the maximum printing width (W) of the printbar, the method proceeds to block 560.

At block 560 a plurality of calibration patterns is printed on the calibration sheet with the printing device to be calibrated.

In some examples, a prompt may be generated to prompt a user to provide the generated calibration sheet to the printing media inlet.

In some examples, the printing device may prompt a user to provide the generated calibration sheet to the printing media inlet such that a side of the calibration sheet with a length at least equal to the maximum printing width is parallel to the printbar. For example, a controller may comprise instructions that may cause the printing device to issue a prompt, for example, via a user interface comprising a display. The prompt may include specific instructions as to how to provide the calibration sheet to the media inlet. For example, the prompt may indicate that the calibration sheet should be provided such that a side having a width at least equal to the printbar or to a maximum printing width of the printbar is parallel to the longitudinal axis (115) of the printbar.

In some examples, the printing device automatically rotates the sheet 90 degrees with respect to the media axis and automatically provides it to the printing media inlet.

In some examples, the printbar comprises a plurality of modules, each module comprising a plurality of submodules, and wherein each one of the plurality of submodules prints a calibration pattern of the plurality of calibration patterns on the generated calibration sheet.

In some examples, the calibration method is performed on a Page-Wide array printing device, wherein a printbar comprises a plurality of modules, each module comprising a plurality of submodules, and wherein each one of the plurality of submodules prints a calibration pattern of the plurality of calibration patterns on the generated calibration sheet.

In some examples, a calibration value for each one of the submodules of the printbar is acquired or measured based at least in part on a calibration pattern printed by the submodule.

In some examples, a calibration parameter is generated for each one of the submodules of the printbar based at least in part on a calibration value.

In some examples, the controller receives a measured calibration datum related to each one of a plurality of submodules of a printbar of the printing device based at least in part on a calibration pattern printed by the submodule.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A method for calibrating a printing device, the method comprising:
   generating a calibration sheet of a calibrating medium having a length at least equal to the maximum printing width of a printbar of the printing device;
   receiving the generated calibration sheet at a printing media inlet of the printing device to be calibrated such that a side of the generated calibration sheet having a length at least equal to a maximum printing width of the printbar is perpendicular to a media axis of the printing device, wherein the printbar comprises a plurality of modules, wherein each of the plurality of modules comprise a plurality of submodules, and each of the plurality of submodules prints a calibration pattern of a plurality of calibration patterns on the generated calibration sheet; and
   printing a plurality of calibration patterns on the calibration sheet with the printing device to be calibrated; and
   acquiring a calibration value for each one of the submodules of the printbar based at least in part on a calibration pattern printed by the submodule.

2. The method of claim 1, comprising prompting a user to provide the generated calibration sheet to the printing media inlet.

3. The method of claim 1, comprising prompting a user to provide the generated calibration sheet to the printing media inlet such that a side of the calibration sheet with a length at least equal to the maximum printing width is parallel to the printbar.

4. The method of claim 1, wherein the printing device automatically rotates the sheet 90 degrees with respect to the media axis and automatically provides it to the printing media inlet.

5. The method of claim 1, wherein the printbar comprises a plurality of modules, each module comprising a plurality of submodules, and wherein each one of the plurality of submodules prints a calibration pattern of the plurality of calibration patterns on the generated calibration sheet.

6. The method of claim 1, wherein the printing device is a Page-Wide array printing device.

7. The method of claim 1, comprising generating a calibration parameter for each one of the submodules of the printbar based at least in part on a calibration value.

8. A printing device comprising:
   a printbar comprising a plurality of modules, and
   a controller to:
      instruct the printing device to generate a sheet of calibration medium of a length at least equal to a maximum printing width of the printbar;
      instruct the printing device to automatically rotate the generated calibration sheet 90 degrees to be provided to a printing media inlet of the printing device to be calibrated such that a side of the sheet of calibration medium having a length at least equal to a maximum printing width of the printbar is parallel to a longitudinal axis of the printbar; and instruct the printing device to execute a calibration procedure.

9. The printing device of claim 8, wherein the controller is to:
generate a prompt to request feeding of the sheet to a printing media inlet of the printing device such that a side of the sheet of calibration medium having a length at least equal to a maximum printing width of the printbar is parallel to the printbar.

10. The printing device of claim 8, wherein the printing device is a Page-Wide array (PWA) printing device.

11. The printing device of claim 8, wherein each of the plurality of modules comprise a plurality of submodules, and wherein each one of the plurality of submodules prints a calibration pattern of the plurality of calibration patterns on the generated calibration sheet as part of the calibration procedure.

12. The printing device of claim 11, wherein the controller receives a sensed calibration datum related to each one of a plurality of submodules of a printbar of the printing device based at least in part on a calibration pattern printed by the submodule.

13. The printing device of claim 12, wherein the controller generates calibration parameters based at least in part on the sensed calibration data.

14. A non-transitory computer readable medium encoded with instructions which when executed by a processor, cause the processor to:
instruct a printing device to generate a sheet of a calibration medium having a length at least equal to a maximum printing width of the printbar of the printing device to be calibrated;
instruct the printing device to automatically rotate the generated calibration sheet 90 degrees to be provided to a printing media inlet of the printing device to be calibrated such that a side of the sheet of calibration medium having a length at least equal to a maximum printing width of the printbar is parallel to a longitudinal axis of the printbar; and
instruct the printing device to execute a calibration procedure on the generated sheet of calibration medium.

* * * * *